US006468491B1

(12) United States Patent
Foury et al.

(10) Patent No.: US 6,468,491 B1
(45) Date of Patent: Oct. 22, 2002

(54) ELIMINATION OF ORGANIC POLLUTANTS FROM THE PASSENGER COMPARTMENT OF A VEHICLE BY PHOTOCATALYSIS

(75) Inventors: Guillaume Foury, Elancourt (FR); Jean Guillemin, St Agnan S/Erre (FR); Nathalie Lemaitre, Viroflay (FR)

(73) Assignee: Valeo Climatisation, La Verriere Cedex (FR)

( * ) Notice: Subject to any disclaimer, the term of this patent is extended or adjusted under 35 U.S.C. 154(b) by 100 days.

(21) Appl. No.: 09/654,534

(22) Filed: Sep. 1, 2000

(30) Foreign Application Priority Data

Sep. 1, 1999 (FR) .............................. 99 10964

(51) Int. Cl.[7] .................... B01D 53/72; A62B 11/02; B60K 37/04
(52) U.S. Cl. .................. 423/245.1; 180/90; 204/157.3; 423/210
(58) Field of Search .................. 423/245.1, 210; 454/156; 180/90; 502/522; 204/157.3; 422/121, 122, 186

(56) References Cited

U.S. PATENT DOCUMENTS 5,707,915 A    1/1998    Taoda .................. 502/159

FOREIGN PATENT DOCUMENTS

| EP | 0798143 | 10/1997 | ............ B60H/3/06 |
| JP | 8252305 | 10/1996 | ............ A61L/9/16 |
| JP | 10244129 | 9/1998 | ............ B01D/53/86 |
| WO | 9637280 | 11/1996 | ............ B01D/53/86 |

OTHER PUBLICATIONS

Patent Abstract of Japan, Pub. No. 08252305, Pub. Date Oct. 1996.
Patent Abstract of Japan, Pub. No. 10244129, Pub. Date Sep. 1998.
Patent Abstract of Japan, Pub. No. 10337442, Pub. Date Dec. 1998.
Patent Abstract of Japan, Pub. No. 10244829, Pub. Date Sep. 1998.

*Primary Examiner*—Wayne A. Langel
*Assistant Examiner*—Maribel Medina
(74) *Attorney, Agent, or Firm*—Liniak, Berenato, & White

(57) ABSTRACT

In a technique for eliminating organic pollutants from the passenger compartment of a vehicle by photocatalysis, the upper face of the dashboard is covered with a layer of photocatalyst. This upper wall includes a plurality of orifices providing diffuse ventilation. The lower face of the dashboard also includes a layer of photocatalyst irradiated by a source of ultra-violet rays, the source being in a diffusion chamber.

12 Claims, 4 Drawing Sheets

ELIMINATION OF ORGANIC POLLUTANTS FROM THE PASSENGER COMPARTMENT OF A VEHICLE BY PHOTOCATALYSIS

FIELD OF THE INVENTION

The invention relates to the elimination of organic pollutants from the air of a motor-vehicle passenger compartment, this vehicle being equipped with a heating, ventilation and/or air-conditioning installation arranged under the dashboard.

BACKGROUND OF THE INVENTION

Toxic- or polluting-gas-filtration apparatus for a vehicle passenger compartment is known from EP 0 798 143, this apparatus using photocatalysis as active principle. The photocatalyst is deposited in powder form on a fibrous medium. The ultra-violet source consists of a lamp situated in proximity to the medium so as to obtain optimal irradiation. This apparatus is self-contained and is placed preferably on the rear shelf of the vehicle. The air to be treated is put into motion by a blower incorporated in the apparatus and passes through the irradiated medium. The cleaned air is sent back into the passenger compartment. During the periods of reactivation of the photocatalyst, the polluted gases are directed towards the air filter of the engine so as to be burned in the engine. This apparatus thus requires a duct to be installed for sending the polluted gases to the engine.

Wo 96/37 280 also envisages the use of a layer of photocatalyst irradiated by natural or artificial UV in order to eliminate organic pollutants from the passenger compartment of the vehicle. In the case of the use of natural UV, this document makes provision for the inner face of the windshield to be covered with a thin layer of photocatalyst. This document also suggests covering elements of the ventilation system, especially the vanes of the blower, with a layer of photocatalyst, which are then irradiated by a lamp emitting in the ultra-violet range.

The use of the windshields as a support for the photocatalyst layer makes it necessary to deposit a layer of photocatalyst which is fine and uniform enough not to distort the vision of the driver of the vehicle. This entails an intricate and expensive manufacturing process.

The object of the invention is to propose a method of eliminating pollutants from a vehicle passenger compartment which is easy to implement and inexpensive.

SUMMARY OF THE INVENTION

According to the present invention there is provided a method of purifying the air of the passenger compartment of a vehicle equipped with a heating, ventilation and/or air-conditioning installation arranged under the dashboard, the method comprising:

providing a photocatalyst deposited on a support; and irradiating the said photocatalyst by light rays, wherein at least a part of the interior fittings of the passenger compartment serves as support for the photocatalyst.

Advantageously the dashboard is used as support for the photocatalyst.

Advantageously at least the outer face of the dashboard, which is visible from the passenger compartment, is covered by a layer of photocatalyst, this layer being irradiated at least by natural visible or ultra-violet rays.

According to another characteristic of the invention, an installation is provided capable of delivering a throughput of ventilation air through a diffusion chamber arranged under the dashboard and communicating with the passenger compartment via a plurality of orifices formed in the wall of the dashboard.

Thus the ventilation air exits at low speed from the dashboard, and laps its outer surface which is covered with a photocatalyst and irradiated by the ultra-violet or natural visible passing through the windshield.

According to another advantageous characteristic of the invention, the inner face of the dashboard, which is situated in the diffusion chamber, is covered with a layer of photocatalyst which is irradiated with a source of ultra-violet rays arranged in the said diffusion chamber, and means are provided for masking the orifices of the wall of the dashboard from the emission of the ultra-violet from the source.

According to a first embodiment, the masking means include a supplementary wall forming a chicane in the diffusion chamber, and covered with a layer of photocatalyst irradiated by the ultra-violet from the source.

This wall may include apertures which are offset with respect to the orifices of the dashboard.

According to a second embodiment, the dashboard includes a plurality of fixed vanes covered on both of their faces by a layer of photocatalyst and oriented in such a way as to mask the air outlets from the emission of the ultra-violet rays from the source.

BRIEF DESCRIPTION OF THE DRAWINGS

Other advantages and characteristics of the invention will emerge on reading the following description given by way of example and with reference to the attached drawings, in which.

DESCRIPTION OF THE PREFERRED EMBODIMENTS

Figure 1:
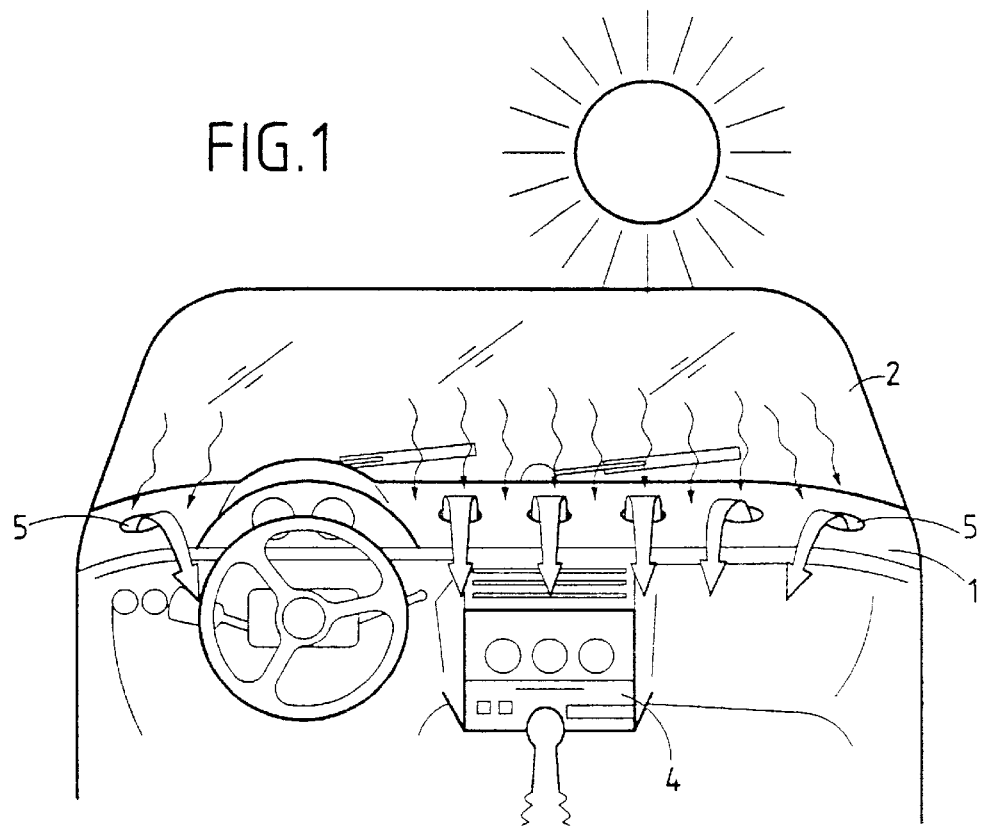
FIG. 1 is a view in elevation of the front part of the passenger compartment of a vehicle which includes an dashboard above an air-conditioning installation, this dashboard being equipped with frontal aeration vents.

In the various figures, like reference numerals refer to like parts.

Figure 2:
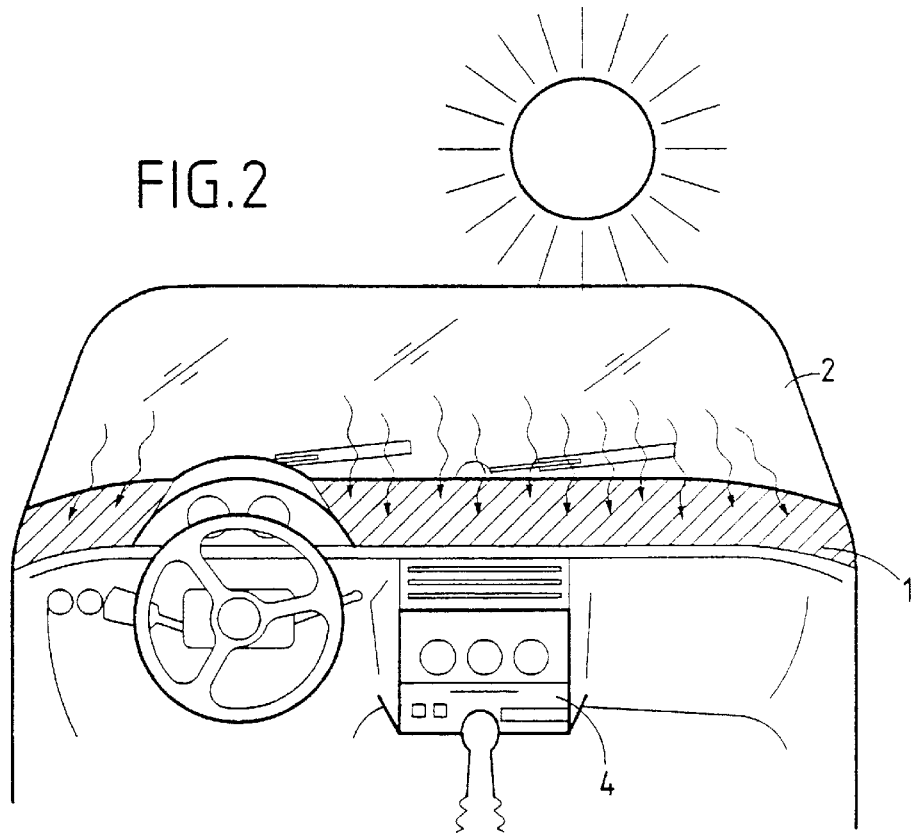
FIG. 2 is a view in elevation of the front part of the passenger compartment of a vehicle which includes above the air conditioning installation a multi-perforated dashboard, allowing diffuse ventilation.
Figure 3:
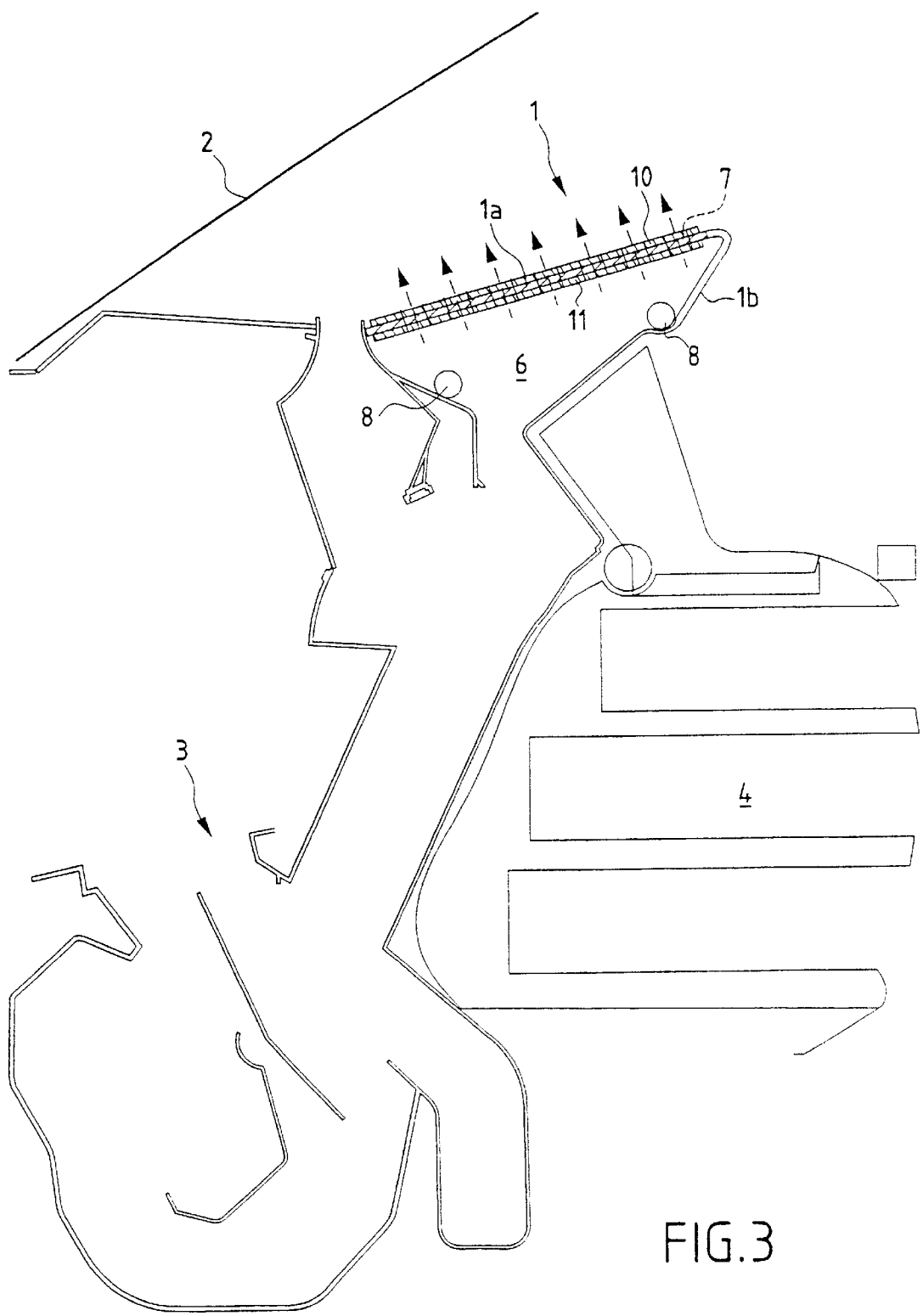
FIG. 3 is a section along the median vertical plane of the front part of the passenger compartment according to FIG. 2.

The dashboard of a vehicle, arranged immediately behind the windshield 2, has been represented in FIGS. 1 to 3 by the reference 1. This dashboard 1 covers over a heating, ventilation and/or air-conditioning installation 3 arranged in the central part of the vehicle at the front of a console 4. The dashboard 1, preferably produced from a plastic, exhibits the form of an overall L-shaped profile which features an upper wall 1a illuminated by the light rays passing through the windshield 2 and a substantially vertical rear wall 1b.

According to the present invention, at least the upper face of the upper wall 1a is covered by a layer 10 of photocatalyst, preferably titanium dioxide $TiO_2$, which is irradiated by the natural visible or ultraviolet rays passing through the windshield 2. This layer 10 of photocatalyst may also be further irradiated by artificial ultra-violet rays emitted by a top-up source.

FIG. 1 shows a rear wall 1b equipped with ventilation outlets 5 which deliver the ventilation air delivered by the installation 3, at a relatively high speed. This exit speed of the ventilation air creates turbulences in the passenger compartment, and the upper face of the upper wall 1a is swept by the ambient air. The organic molecules contained in the ambient air are then destroyed, as a result of the activation of the photocatalyst, especially by the natural or artificial ultra-violet rays, when they make contact with the particles of $TiO_2$.

In order to promote the destruction of the organic molecules contained in the ventilation air delivered by the installation 3, as shown in FIGS. 2 and 3, the dashboard 1 preferably covers over a diffusion chamber 6 which receives ventilation air from the installation 3, and at least the upper wall 1a is equipped with a plurality of ventilation-air outlet orifices 7. The diffusion chamber 6 extends over the entire width of the dashboard 1. The orifices 7 can be produced in the form of a multi-perforation or in the form of a plurality of parallel slots, which overall exhibit a relatively high air-outlet surface area. This technique, known by the name of diffuse ventilation or of gentle ventilation, imparts a relatively slow speed to the ventilation air. The ventilation air delivered into the passenger compartment first of all laps the upper surface of the upper wall 1a 1and is purified as soon as it enters the passenger compartment by photocatalysis of the organic molecules.

According to another characteristic of the invention, at least one ultra-violet ray lamp 8 is installed in the diffusion chamber 6. This lamp 8 irradiates the lower face of the upper wall 1a, which, in this case, is also covered with a layer 11 of photocatalyst.

In order to prevent the ultra-violet rays emitted by the lamp 8 being diffused through the orifices 7 of the upper wall 1a of the dashboard 1, which could be uncomfortable or even dangerous at night due to reflection in the windshield 2, means are provided for masking the orifices 7.

Figure 4:
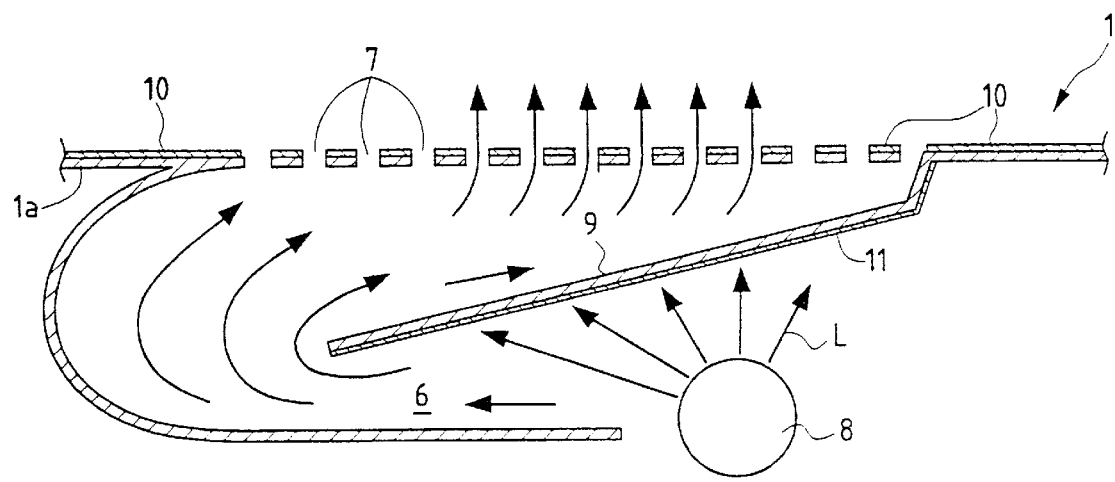
FIG. 4 is a section along the median vertical plane of the dashboard and of the diffusion chamber equipped with a source of ultra-violet rays and with an intermediate wall masking the orifices of the dashboard from the emission of the ultra-violet rays.

As shown in FIG. 4, the masking means may be formed by an intermediate wall 9 which is lodged in the diffusion chamber 6 and which constitutes a chicane negotiated by the ventilation air. The intermediate wall 9 is arranged between the lamp 8 and the upper wall 1a of the dashboard 1. Its lower face, irradiated by the lamp 8 is, in this case, covered with the layer 11 of photocatalyst. This intermediate wall 9 is preferably integral with the dashboard 1 and produced in a single piece with it. In this embodiment of the masking means, the orifices 7 of the upper wall 1a can be produced in the form of a multi-perforation or of parallel slots.

Figure 5:
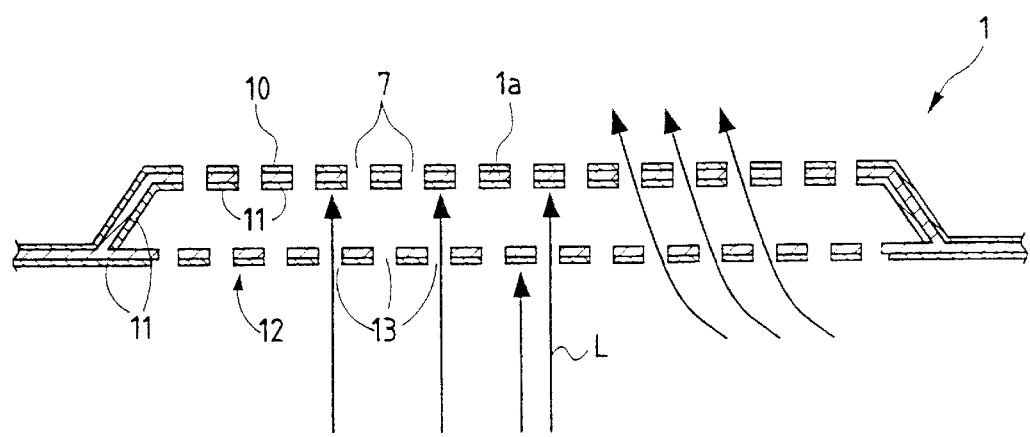
FIG. 5 shows a variant embodiment of the means for masking the orifices of the dashboard.

When the upper wall 1a is presented in the form of a grille having parallel slots, the means for masking the orifices 7 may consist of a second grille 12 parallel to the upper wall 1a and having a set of slots 13 which are parallel and offset with respect to the slots 7 of the upper wall 1a. This grille 12 makes it possible to filter the light rays emitted by the lamp 8 without blocking the diffusion of the ventilation air. The pitch of the two sets of slots 7 and 13 may be variable and should be calculated as a function of the incidence of the light rays L. With this architecture, shown in FIG. 5, the upper wall 1a which includes the orifices 7 is covered over with photocatalyst on its two faces, and the lower grille 12 is covered with photocatalyst on at least its lower face.

Figure 6:
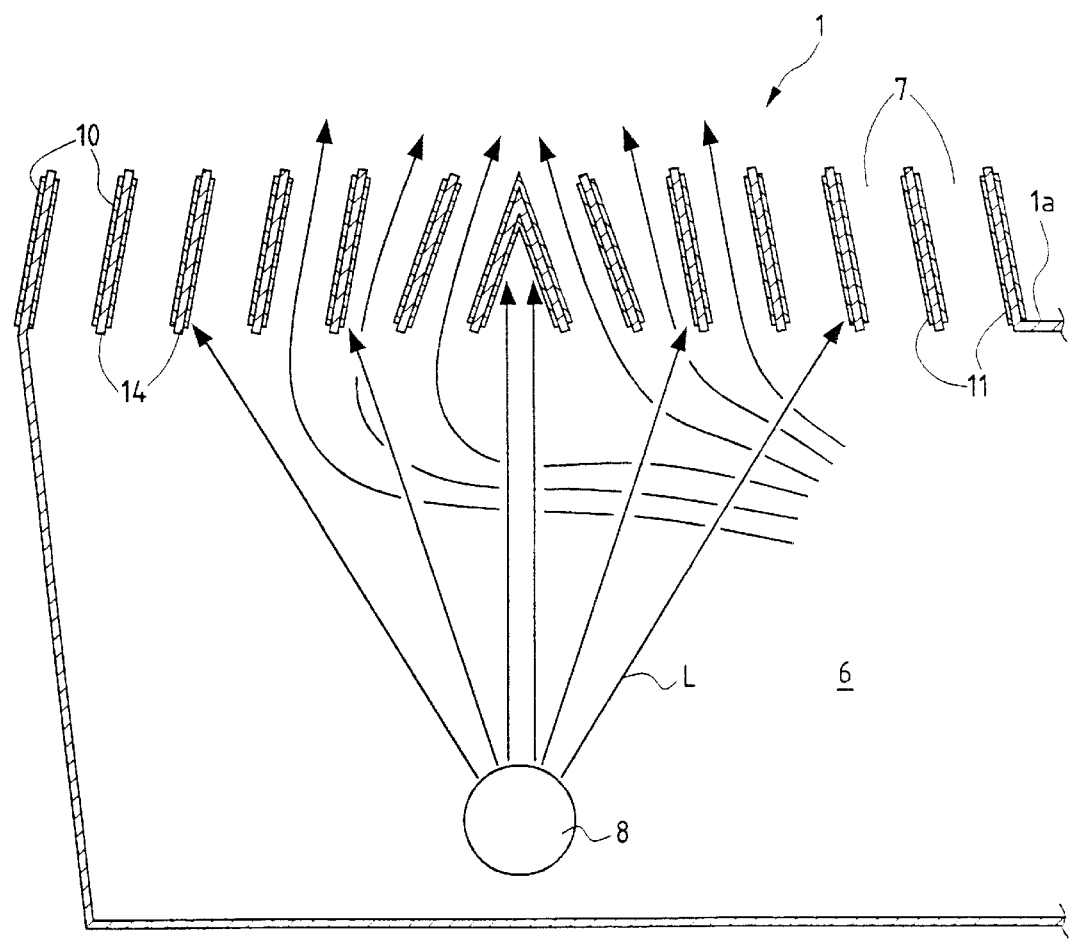
FIG. 6 is a section along the median vertical plane of an dashboard equipped with a plurality of vanes providing the diffuse ventilation.

FIG. 6 shows another embodiment of the orifices 7 of the upper wall 1a of the dashboard 7. Here, the dashboard 1 includes a plurality of fixed vanes which are inclined with respect to the horizontal. The air-outlet orifices 7 are formed by the spaces separating the upper edges of the vanes 14. The vanes 14 are oriented in such a way that all the light rays L emitted by the lamp 8 strike the lower faces of the vanes 14 with no possibility of diffusing through the orifices 7.

The vanes 14 are covered over at least on their lower face by a layer 11 of photocatalyst. Their upper faces may also be covered over by a layer 10 of photocatalyst which will be irradiated by the natural visible or ultra-violet rays passing through the windshield 2.

The layers 10 and 11 of photocatalyst may be arranged on the upper wall 1a, the intermediate wall 9, the lower grille 12 and the vanes 14 in different ways depending on the composition of the support.

In the case in which the support is made of metal or plastic, the catalyst is integrated onto the support, either via a paint containing the photocatalyst, and produced in such a way that, on the one hand, the photocatalyst remains in its active form, in the photocatalysis sense, after the paint has dried, and that, on the other hand, the color and the brightness do not generate any troublesome reflection for the driver and the passengers on the windshield, or by depositing a transparent photocatalytic gel as described in WO 96/37 280. The paint and the gel are each deposited either by dipping, or by spraying, or by deposition of a layer via a roller.

It should be noted that, in the case in which the upper part 1a of the dashboard exhibits multi-perforations, these can be formed by the meshes of a fabric closing off an aperture formed in the dashboard 1 above the diffusion chamber 6. In this case, the photocatalyst and its binder may be deposited by impregnation of the fabric.

It should also be noted that, in order to promote elimination of the organic pollutants from the air of the passenger compartment by natural visible or ultra-violet rays, it is possible to cover over the interior surfaces of the passenger compartment, other than the top of the dashboard, with a layer of photocatalyst. It is also possible to apply a photocatalyst especially to the door trims, the inner face of the hood, the rear shelf and the seat coverings.

What is claimed is:

1. A method of purifying the air of a passenger compartment of a vehicle equipped with at least one member selected from the group consisting of heating, ventilation and air-conditioning installation arranged under a dashboard, the method comprising:
   providing a photocatalyst deposited on a support; and
   irradiating said photocatalyst by light rays, wherein at least a part of interior fittings of the passenger compartment serves as said support for the photocatalyst.

2. The method of claim 1, wherein at least the dashboard is used as support for the photocatalyst.

3. The method of claim 2, wherein the dashboard has an outer face which is visible from the passenger compartment, and wherein at least said outer face of the dashboard is covered by a layer of photocatalyst, the method comprising irradiating said layer at least by at least one source selected from the group consisting of natural visible and ultra-violet rays.

4. The method of claim 3, wherein an installation is provided capable of delivering a throughput of ventilation air through a diffusion chamber arranged under the dashboard and communicating with the passenger compartment via a plurality of orifices formed in the wall of the dashboard.

5. The method of claim 4, wherein the dashboard has an inner face which is situated in the diffusion chamber, said inner face being covered with a layer of photocatalyst, a source of ultra-violet rays is arranged in the said diffusion chamber to irradiate the photocatalyst, and means are provided for masking the orifices of the wall of the dashboard from emission of the ultra-violet rays from the source.

6. The method of claim 5, wherein the orifices are masked by a supplementary wall forming a chicane in the diffusion chamber, the said supplementary wall being covered with a layer of photocatalyst irradiated by the ultra-violet rays emitted by the source.

7. The method of claim 6, wherein the supplementary wall defines apertures which are offset with respect to the orifices of the dashboard.

8. The method of claim 5, wherein the dashboard includes a plurality of fixed vanes covered on both of their faces by a layer of photocatalyst and oriented in such a way as to mask the air outlets from the emission of the ultra-violet rays from the source.

9. A method of purifying the air of a passenger compartment of a vehicle equipped with at least one member selected from the group consisting of heating, ventilation and air-conditioning installation arranged under a dashboard, the method comprising:
   providing a photocatalyst deposited on a support surface within said passenger compartment, said support surface being exposed to air and light; and
   irradiating said photocatalyst by light rays, wherein at least a part of interior fittings of the passenger compartment serves as said support surface for the photocatalyst.

10. The method of claim 9, wherein said support surface forms a part of at least one member selected from the group consisting of said dashboard, trim of a door, covering for a seat, and covering for a console.

11. The method of claim 9, wherein the support surface is situated in a diffusion chamber of said installation under said dashboard, said support surface being covered with a layer of photocatalyst, and a source of ultra-violet rays is arranged in said diffusion chamber to irradiate the photocatalyst.

12. The method of claim 11, further comprising means for masking orifices of the dashboard from emission of the ultra-violet rays from the diffusion chamber.

* * * * *